United States Patent [19]
Hopkin et al.

[11] Patent Number: 6,132,613
[45] Date of Patent: *Oct. 17, 2000

[54] CENTRIFUGAL REVERSE-OSMOSIS DESALINATION UNIT INCORPORATING AN ANNULAR MEMBRANE CARTRIDGE

[75] Inventors: David A. Hopkin, Victoria; Peter M. Wild, Kingston; Goeffrey W. Vickers; Antony Moilliet, both of Victoria, all of Canada

[73] Assignee: Her Majesty the Queen in right of Canada, as represented by the Minister of National Defence, Ottawa, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,882

[22] Filed: May 19, 1997

[30] Foreign Application Priority Data

Jun. 4, 1996 [CA] Canada .................................. 2178118

[51] Int. Cl.$^7$ .................................................. B01D 63/16
[52] U.S. Cl. ................................ 210/321.68; 210/321.83
[58] Field of Search .............................. 210/364, 321.68, 210/321.67, 321.74, 321.83, 367, 365, 380.1, 402, 321.6, 493.4, 360.1, 380.3

[56] References Cited

U.S. PATENT DOCUMENTS

| | | |
|---|---|---|
| 3,256,001 | 6/1966 | Renzi . |
| 3,367,504 | 2/1968 | Westmoreland . |
| 3,385,769 | 5/1968 | Brose . |
| 3,616,298 | 10/1971 | Fassell, Jr. . |
| 3,669,879 | 6/1972 | Berriman . |
| 3,840,121 | 10/1974 | Baram . |
| 3,933,646 | 1/1976 | Kanamaru et al. ................. 210/321 R |
| 4,230,564 | 10/1980 | Keefer . |
| 4,333,832 | 6/1982 | Siwecki et al. . |
| 4,886,597 | 12/1989 | Wild et al. . |
| 5,137,637 | 8/1992 | Korin ....................................... 210/634 |

*Primary Examiner*—W. L. Walker
*Assistant Examiner*—Richard W. Ward
*Attorney, Agent, or Firm*—Nixon & Vanderhye

[57] ABSTRACT

This invention relates to an apparatus for separating an original feed solution such as seawater into a product solution of decreased concentration (relatively fresh water) and an exhaust solution of increased concentration. The apparatus includes an annular reverse osmosis membrane means, contained in an annular pressure vessel that is housed in a rotor assembly. The rotor is arranged to spin on an axle and is located within an evacuated shroud. The apparatus further includes supply means for supplying the original feed solution to the reverse osmosis membrane, exhaust means at an outermost radius of the reverse osmosis membrane for removing the exhaust solution from the reverse osmosis membrane, product removal means at an innermost radius of the reverse osmosis membrane for removing the product solution from the reverse osmosis membrane and means for creating a pressure differential across the reverse osmosis membrane to separate the original feed solution into the product solution and the exhaust solution. The supply means and the exhaust means are relatively axially and radially spaced such that the feed solution travels along a combined radial and axial flow-path.

14 Claims, 5 Drawing Sheets

CENTRIFUGAL REVERSE-OSMOSIS DESALINATION UNIT INCORPORATING AN ANNULAR MEMBRANE CARTRIDGE

FIELD OF THE INVENTION

This invention relates to an apparatus for removing solutes from a solution by reverse osmosis, and particularly for removing salt from sea-water by reverse-osmosis.

BACKGROUND OF THE INVENTION

Desalination of seawater by reverse osmosis is a process in which seawater under high pressure, is separated into fresh water and high concentration brine. The separation is achieved by means of membranes that are relatively permeable to water molecules but relatively impermeable to salt ions. Conventional reverse-osmosis desalination units employ one of two techniques for developing this high pressure. Some use high pressure pumps to elevate the feed seawater to between 800 and 1000 psi, while others use centrifuges. Although centrifuges offer theoretically higher efficiencies, practical difficulties have prevented widespread development of centrifugal reverse-osmosis desalination units.

One practical difficulty that has prevented the widespread implementation of centrifugal systems is the design of a membrane configuration suitable for a centrifuge. Siwecki et al., in U.S. Pat. No. 4,333,832 and Wild et al., in U.S. Pat. No. 4,886,597, describe centrifuge designs that accommodate commercially available membrane cartridges. Baram in U.S. Pat. No. 3,840,121; Berriman, in U.S. Pat. No. 3,669,879 and Keefer in U.S. Pat. No. 4,230,564 all describe membrane configurations designed specifically for centrifuge rotors. A principal benefit of this type of membrane configuration is that a greater volume of membrane can be accommodated into a given size of a rotor than by using standard commercially available membrane cartridges. Therefore, the freshwater production from a given size of a rotor is also greater.

Each design described by Baram, Berriman and Keefer are, in some regard, impractical. The membrane configuration proposed by Baram incorporates tubular membranes pressurized internally. Although such membranes are available for low pressure reverse-osmosis applications, tubular membranes that can withstand the high-pressure required for seawater desalination are designed to be pressurized externally only. The membrane configuration proposed by the Keefer patent occupy only a small fraction of the available space within the rotor. The potential for increased productivity from a given size of a rotor is, therefore, not capitalized upon. Various membrane configurations are described by Berriman employ flow patterns which waste rather than recover the energy of the exhaust brine.

One principal benefit of centrifugal reverse-osmosis is that the energy of the exhaust brine is recovered. To achieve this condition, however, the exhaust brine must be returned to the central axis of the rotor before exiting the rotor. In each of Berriman's designs, the feed seawater enters the rotor at the central axis and the concentrated brine exits at the periphery without being returned to the central axis, which is wasteful of the energy in the exhaust brine.

A further problem related to prior art devices is that the reverse osmosis membranes experience concentration polarization which is caused by salt buildup on one side of the reverse osmosis membrane. Many methods have been attempted in the prior art to reduce the negative effects of concentration polarization, each having varying degrees of success.

It is therefore an objective of the invention to provide an apparatus for separating a single solution into at least two solutions, one of which has a lower concentration of a given impurity and one of which has a higher concentration of the impurity than original solution before separation and which utilizes a membrane configuration that is capable of reducing the negative effects of concentration polarization.

In the following discussion the original solution will be termed the "feed solution" and the lower concentration solution will be termed the "product solution," while the higher concentration solution will be termed the "exhaust solution."

SUMMARY OF THE INVENTION

According to the invention there is provided an apparatus for separating an original feed solution into a product solution of decreased concentration and an exhaust solution of increased concentration comprising an annular reverse osmosis membrane means, a rotor assembly for housing the reverse osmosis membrane means. The rotor assembly consists of an annular pressure vessel, and an axle means about which the rotor assembly is rotatable. A support means supports the annular pressure vessel for rotation about the axle; supply means for supplying the original feed solution to the reverse osmosis membrane; exhaust means at an outermost radius of the reverse osmosis membrane for removing the exhaust solution from the reverse osmosis membrane; product removal means at an innermost radius of the reverse osmosis membrane for removing the product solution from the reverse osmosis membrane; means for creating a pressure differential across the reverse osmosis membrane to separate the original feed solution into the product solution and the exhaust solution; and the supply means and the exhaust means being relatively axially and radially spaced such that the feed solution travels along a combined radial and axial flow-path.

BRIEF DESCRIPTION OF THE DRAWINGS

A better understanding of the invention will be obtained by reference to the detailed description below, and in reference to the following drawings in which.

DETAILED DESCRIPTION OF THE PREFERRED EMBODIMENT

Figure 1:
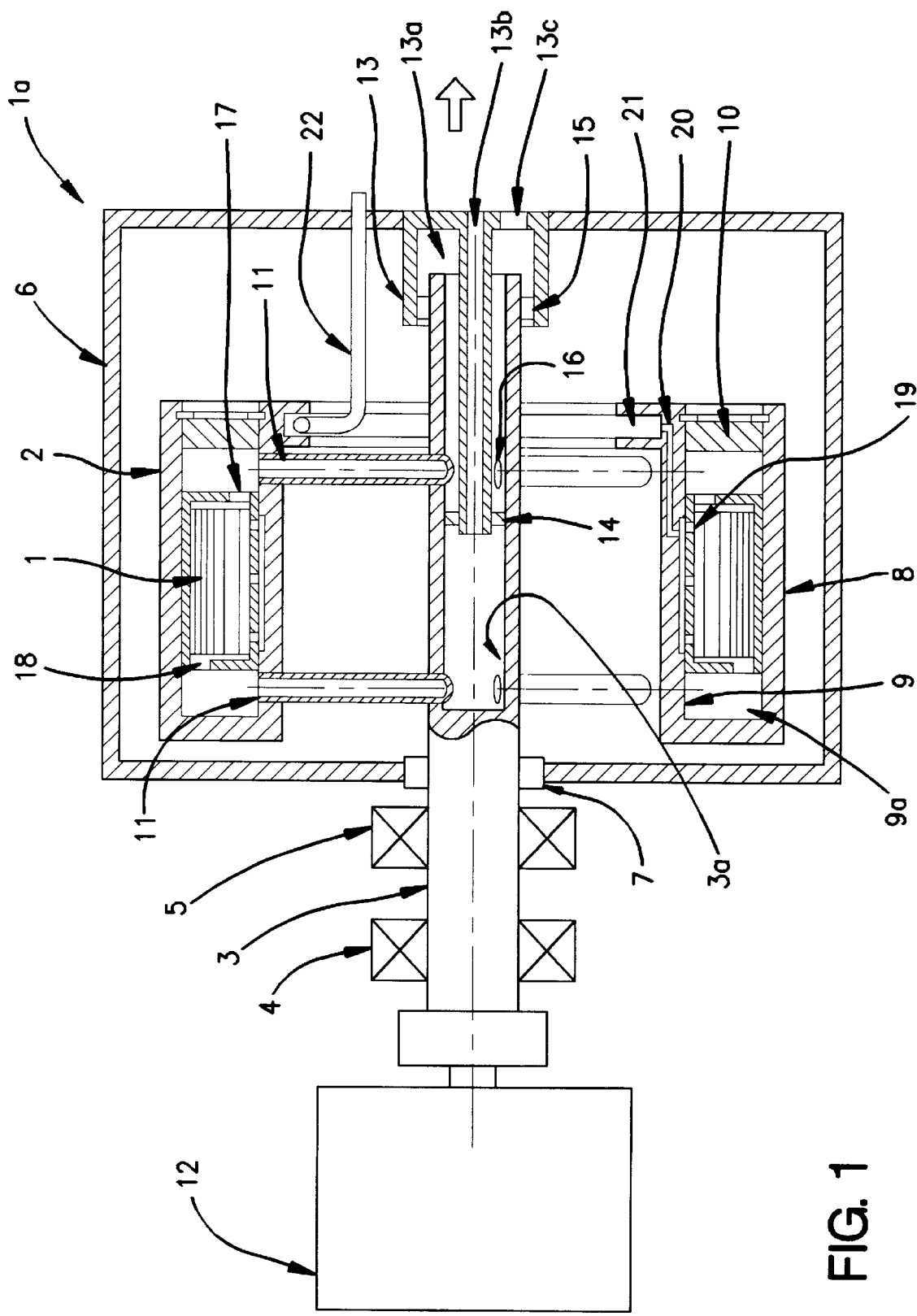
FIG. 1 is a sectional side elevation of a first embodiment of the invention that incorporates a spiral wound membrane configuration according to the present invention.

Referring to FIG. 1, a first embodiment of the invention of the invention is shown generally by numeral 1a. A spiral-wound reverse osmosis membrane 1 is housed in a rotor assembly 2. The rotor assembly 2 is supported for rotation about an axle 3, having a hollow bore 3a in part of it, which rotates in axially spaced bearings 4 and 5 respectively. The rotor assembly 2 rotates within an evacuated enclosure 6 which forms a close fitting cylindrical shroud 6 around the rotor 2. A rotary seal 7 maintains a seal between the cylindrical shroud 6 and the axle 3. A vacuum means (not shown) is used to evacuate air from the shroud 6 and is a known technique for reducing windage between the peripheral surface of the rotor 2 and the surrounding air.

The rotor assembly 2 comprises an annular pressure vessel 9 defined by a cylindrical outer shell 8, a cylindrical inner shell 9 and a removable annular end closure 10. The space between the inner and outer shells define an annular space 9a whose thickness is less than the radius of the inner shell as shown in FIG. 1. It will therefore be appreciated from a review of FIG. 1 that the shells 8 and 9, i.e., walls 8 and 9, are separated one from the other by a distance less than the radius of inner shell or wall 9 from the axis of rotation of rotor assembly 2. The reverse-osmosis membrane means 1 is housed in the annular space 9a of the pressure vessel 9. Hollow radial spokes 11 locate the annual pressure vessel with respect to axle 3. The spokes serve a dual purpose, namely to locate the rotor 2 with respect to the axle 3 and to conduct feed solution to the annular pressure vessel 9 and conduct exhaust fluid away from the pressure vessel 9. The bore of the radial spokes 11 extends into the hollow bore portion 3a of the axle 3.

A pressure differential is created within the reverse-osmosis membrane means 1 by rotating the rotor assembly 2 at high speed. Rotary power is provided by drive motor 12.

The feed solution is conducted to the rotor assembly 2 via an inlet/outlet coupling 13, attached to the shroud 6. The inlet/outlet coupling 13 has a feed inlet opening 13b and an exhaust outlet opening 13c. Rotary seals 14 and 15 connect the stationary inlet/outlet coupling 13 to the spinning rotor. The rotary seals 14 and 15 also serve to separate the feed solution from the exhaust solution in the hollow bore 3a of the axle 3. Feed solution flows from the inlet/outlet coupling 13 into the hollow bore 3a in part of the rotor axle 3, which carries the rotor assembly 2. The feed solution then passes through radial bore holes 16 in the axle and into the hollow bore of the radial spokes 11. Upon rotation of the rotor, a set of spokes 11 carry the feed solution radially outward to the annular pressure vessel 9a. The feed solution enters the spiral membrane means 1 through an inlet port 17. The feed solution then flows axially through the membrane means 1 and exits the membrane means 1 through an outlet port 18 located at an outermost radius of the membrane means. Product solution flows through the perforations 19 in the wall of the inner shell of the membrane means 1 and then flows through passages 20 and accumulates in an annular groove 21. The product solution is collected from the rotor by skimmer tube 22. The exhaust solution is returned to the rotor axle 3, via the hollow radial spokes 11, and then flows down the bore 3a in axle 3 and out through a central tube 13a in the inlet/outlet coupling 13.

Figure 2:
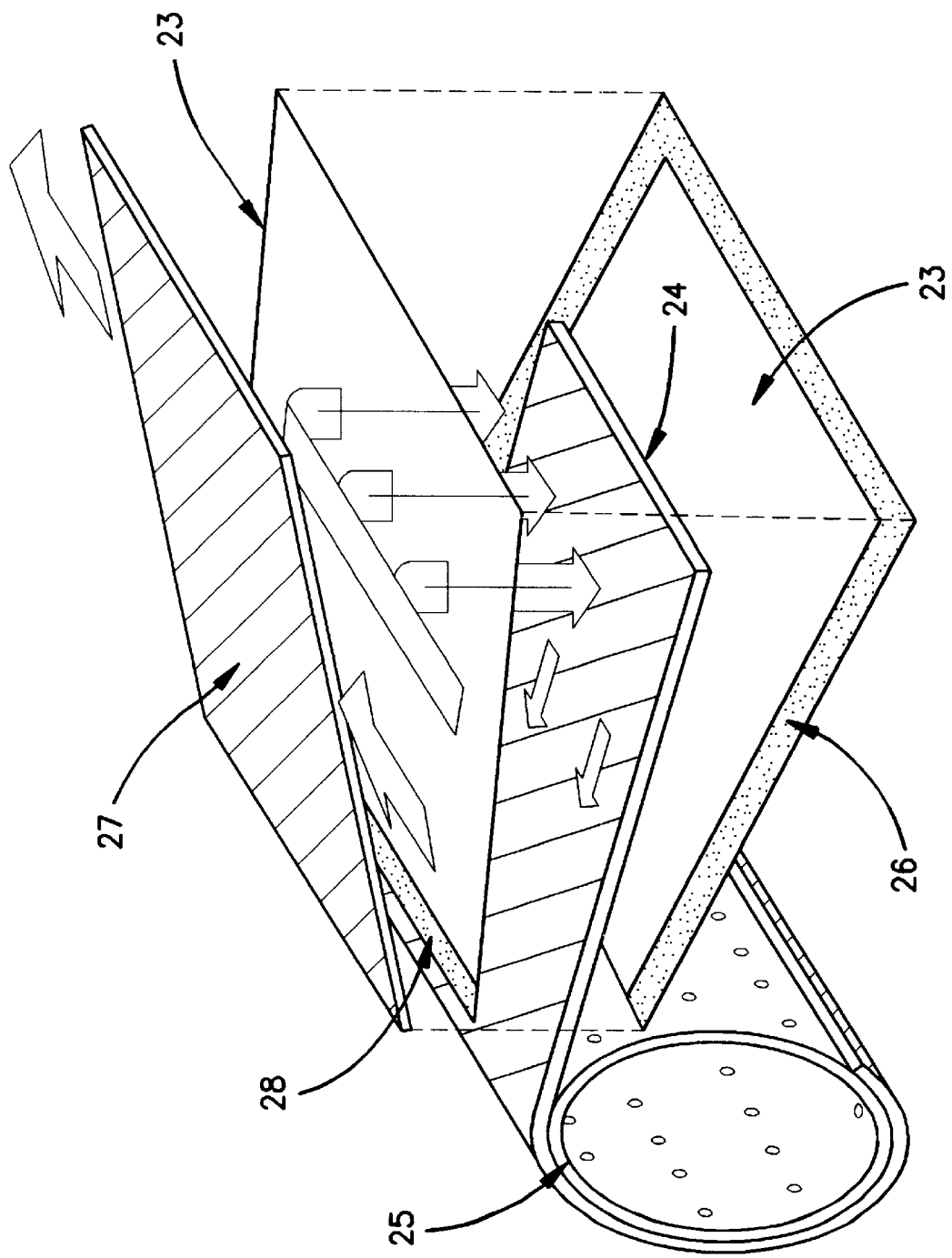
FIG. 2 is an isometric view of the spiral wound membrane configuration according to the present invention.

Referring to FIG. 2, the spiral wound membrane means consists of a spiral wrapping of alternating layers of membrane 23 and fine mesh spacer 24 about an inner perforated shell 25. The two layers of membrane 23, separated by the fine mesh spacer 24, are formed into an envelope and sealed with glue 26 along all but one edge. The fine mesh spacer 24 extends from the unsealed edge of the envelope and is wrapped about the inner perforated shell 25 such that the fine mesh spacer 24 is open to the perforations. A sheet of coarse mesh spacer 27 is sealed to the envelope along an inner edge 28 of the membrane sheet 23. A second membrane-mesh-membrane-mesh envelope, not shown, is then wrapped onto the inner perforated shell 25. The inner edge of the lower membrane sheet of this second envelope is sealed to the inner edge of the coarse mesh spacer 27. Further membrane-mesh-membrane-mesh envelopes are similarly added and the entire assembly of membrane and mesh layers are wrapped tightly around the perforated inner shell 25.

The coarse mesh spacer 27 is, thus, open to flow axially through the cartridge and the fine mesh spacer 24 is open to flow spirally inward to the perforated inner shell 25. This fine mesh 24 spacer, thus, forms a spiral path along which the fresh water follows inward to the perforated inner shell 25. The fresh water which is flowing into the fine mesh spacer (through the membrane) is, initially, forced radially outward due to centripetal acceleration. However once the fine mesh spacer is filled with fresh water this fresh water overflows through the perforations in the inner shell.

Pressurized feed solution flows axially through the spiral membrane means in the coarse mesh spacer 27. Product solution permeates through the membranes, into the fine mesh spacer 24 and spirals inward to the perforated inner shell 25. The exhaust solution continues axially in the coarse mesh spacer 27.

The method of construction of this membrane means is, conceptually, as described by J. C. Westmoreland in U.S. Pat. No. 3,367,504. However, the annular design and its application to centrifugal reverse-osmosis, however, are not previously described in the earlier patent literature.

As product solution permeates through a reverse-osmosis membrane, salt 'builds up' on the feed solution side of the membrane. This effect is called concentration polarization. The effect of concentration polarization on membrane performance is influenced by the centripetal acceleration in a centrifugal reverse osmosis device.

Figure 5:
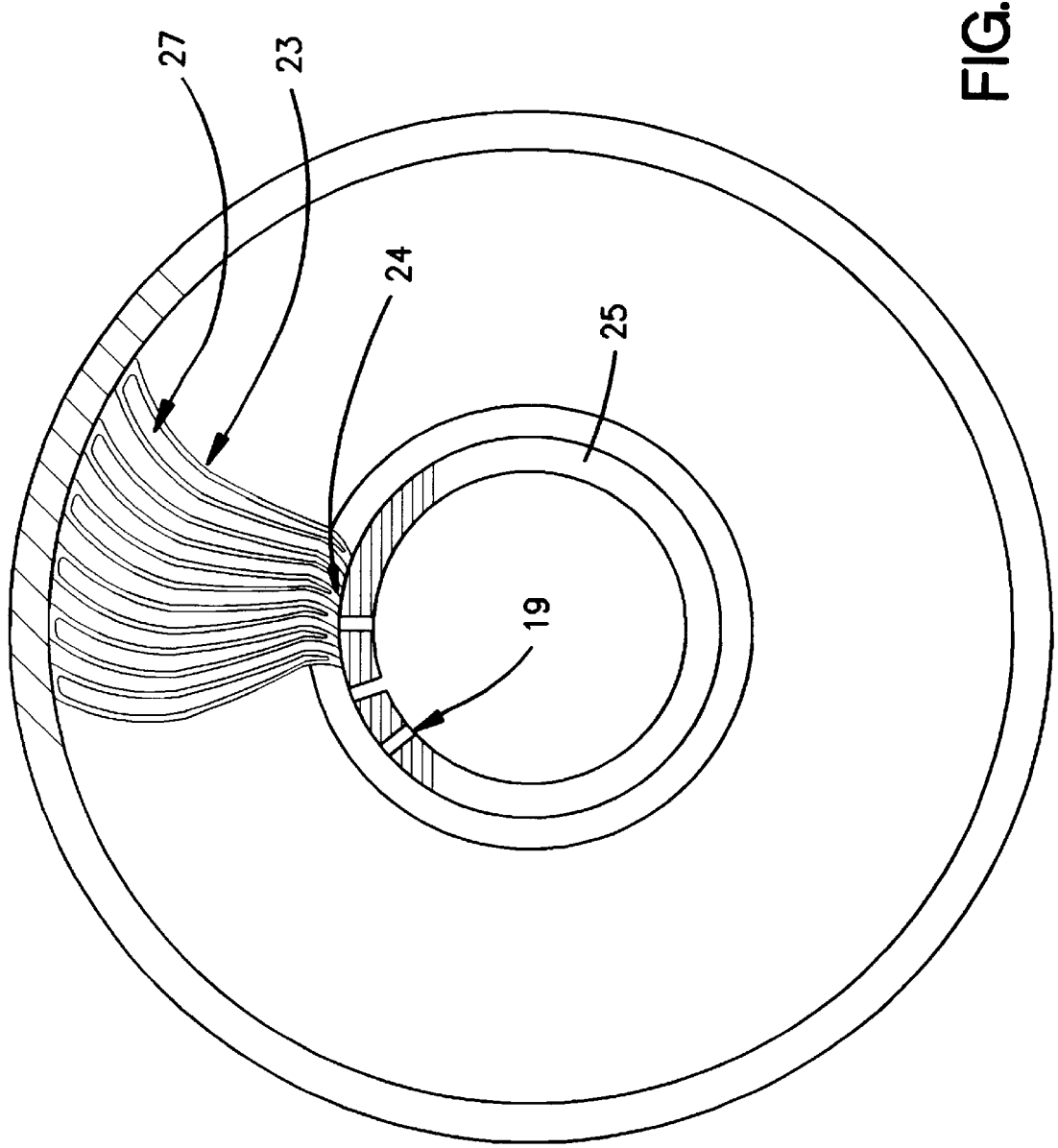
FIG. 5 is a partial sectional view of a multiple start spiral wound membrane means.

Membranes whose feed solution flow paths are oriented radially inward suffer reduced performance while those oriented radially outward experience improved performance. To minimize the area of membrane surfaces oriented radially inward in this membrane cartridge, the number of 'starts' in the spiral configuration of membrane and mesh should be as large as possible. That is, the number of envelopes should be as large as possible. As the number of 'starts' becomes large, the orientations of the feed solution flow paths tend to the radial direction. A spiral wound membrane having multiple 'starts' is shown in FIG. 5.

The orientations of the membrane surfaces also reduce particulate fouling of the membrane. Suspended particles having a greater density than the feed solution will be stripped from the membrane surface by centrifugal force.

Referring again to FIG. 1, the arrangement of the inlet port 17 and outlet port 18 also affect concentration polarization. The feed solution is admitted to the spiral membrane means through the inlet port 17 at the innermost radius of the membrane means 1. The exhaust solution exits the spiral membrane means through the outlet port 18 found adjacent, the outermost radius of the membrane means. This arrangement of the inlet port 17 and the outlet port 18 provides a combined axial and radial flow path for the feed solution. The radial component ensures that the most concentrated and, therefore, the most dense of the exhaust solution is removed from the membrane means.

Figure 3:
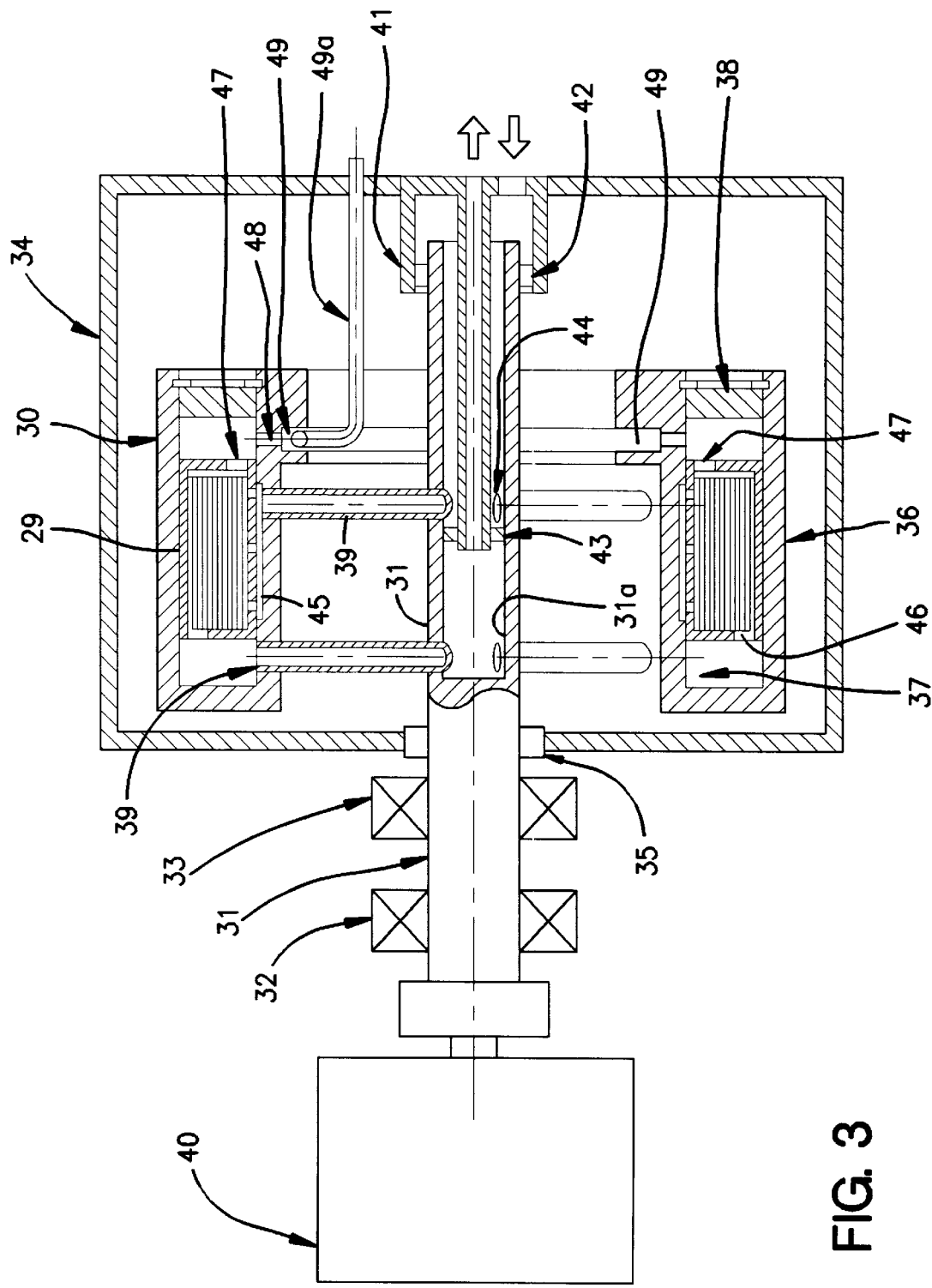
FIG. 3 is a side elevation in full section of a second embodiment of the invention which incorporates a hollow fine fibre membrane means.

Referring now to FIG. 3, a second embodiment of the invention provides a hollow, fine fibre reverse-osmosis membrane means 29 housed in a rotor assembly 30. The rotor assembly 30 is similar in construction to the rotor assembly 2 in FIG. 1. The rotor assembly 30 is supported for rotation about axle 31 on bearings 32 and 33. Axle 30 has a bore 31a at one end thereof, as shown. The rotor assembly 30 rotates within an evacuated enclosure means as a close fitting cylindrical shroud 34. A vacuum means, (not shown), is used to evacuate the shroud 34. Rotary seal 35 maintains a seal between the shroud 34 and the axle 31. The rotor assembly 30 is an annular pressure vessel comprising a radially outer shell 36, a radially inner shell 37 and a removable annular end closure 38 The radially outer shell 36 and radially inner shell 37 as illustrated in FIG. 3 are separated by a distance less than the radius of the inner shell 37 to form the annular pressure vessel. Hollow radial spokes 39 locate the annular pressure vessel with respect to axle 31. The hollow fine fibre reverse-osmosis membrane means 29 is housed in the annular pressure vessel.

Means for creating a pressure differential within the hollow fine fibre reverse-osmosis membrane means 29 is provided by rotating the rotor assembly 30 at high speed. Rotary power is provided by drive motor 40.

The feed solution is conducted to the rotor assembly 30 via an inlet/outlet coupling 41. Rotary seals 42 and 43 connect the stationary inlet/outlet coupling 41 to the spinning rotor. Feed solution flows from the inlet/outlet coupling 41 into the bore 31a in the rotor axle 31 and then passes through radial holes 44 in the axle and into the hollow radial spokes 39. The spokes 39 direct the feed solution radially outward to the annular pressure vessel. The feed solution enters the hollow fine fibre membrane means 29 through its perforated inner shell 45, flows in a combined axial and radial path through the outlet port 46. Product solution flows from the membrane means through the product port 47 and then flows through passages 48 and accumulates in annular groove 49. The product solution is collected from the rotor by a skimmer tube 49a. The exhaust solution is returned to the rotor axle 31 via the hollow radial spokes 39. The exhaust solution then flows down the bore in axle 31 and out through the central tube in the inlet/outlet coupling 41.

Figure 4:
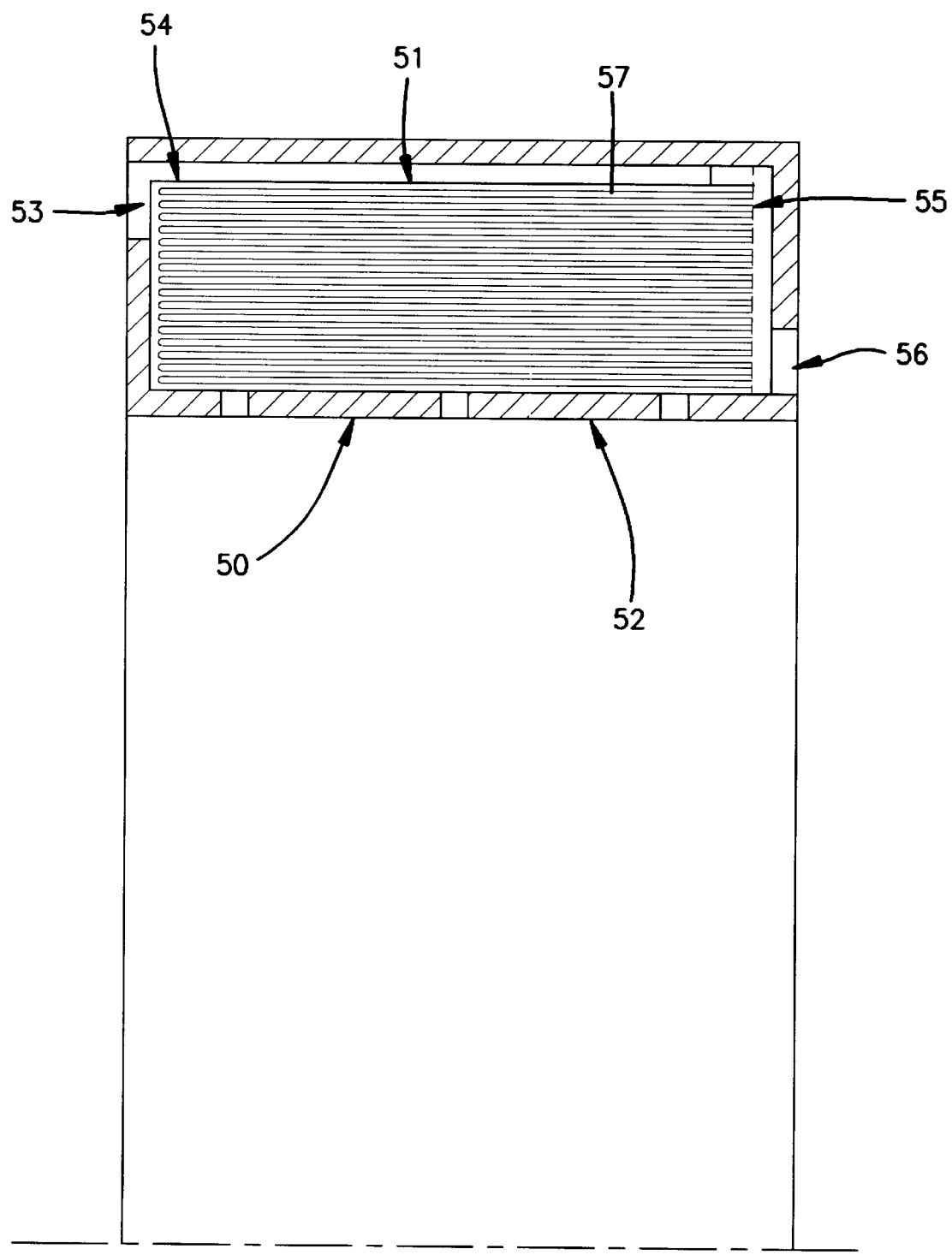
FIG. 4 is a partial sectional view of the hollow fine fibre membrane means.

Referring to FIG. 4, the hollow fine fibre membrane means 57 consists of a bundle of hollow fine fibers 51 housed in an annular containment vessel 50. Each of these fibers comprises a thin film of membrane jacketing a porous hollow fibre. Each fibre 51 is arranged in an U-shaped pattern. The closed ends of the hollow fibre U's are potted in epoxy 54 at the outlet end of the membrane means. The open ends are potted in epoxy 55 at the other end of the membrane means. Feed solution enters the containment vessel through the perforated inner shell 52. The feed solution flows radially and axially through the bundle of hollow fibers and exits from outlet port 53. As the feed solution flows through the bundle of fibers, product solution permeates into the hollow core of the fibers. This product solution exits from the open ends of the fibers and flows out from the product solution outlet port 56.

As in the spiral membrane means, the hollow fine fibre membrane means herein, provides a combined axial and radial flow path for the feed solution. The radial component ensures that the most concentrated and, therefore, the most dense exhaust solution is removed from the membrane means.

While the invention has been described concerning specific embodiments thereof and in a specific use, various modifications thereof will occur to those skilled in the art without departing from the spirit and scope of the invention as set forth in the appended claims.

The terms and expressions employed in the specification are used as terms of description and not of limitations, and are not intended to exclude any equivalents of the features shown and described or portions thereof Nevertheless, it is recognized that various modifications are possible within the scope of the claims to the invention.

The embodiments of the invention in which an exclusive property or privilege is claimed are defined as follows:

1. An apparatus for separating an original feed solution into a product solution of decreased concentration and an exhaust solution of increased concentration comprising:
   (a) annular reverse osmosis membrane means;
   (b) a rotor assembly having an axis of rotation for housing said reverse osmosis membrane means, said rotor assembly comprising:
      i. an annular pressure vessel with said annular reverse osmosis membrane fitted between inner and outer walls of said pressure vessel, annular inner and outer walls of said annular pressure vessel being separated by a distance less than the radius of the inner wall from said axis of rotation;
      ii. axle means about which said rotor assembly is rotatable;
      iii. support means for supporting said annular pressure vessel for rotation about said axle;
   (c) supply means for supplying said original feed solution to said reverse osmosis membrane;
   (d) exhaust means at an outermost radius of said reverse osmosis membrane for removing said exhaust solution from said reverse osmosis membrane, said exhaust means including means for returning the exhaust solution to said axle means where it is removed from said apparatus;
   (e) product removal means at an innermost radius of said reverse osmosis membrane for removing said product solution from said reverse osmosis membrane;
   (f) one of said product removal means and said supply means being located at an outer edge of said reverse osmosis membrane means and the other of said product removal means and said supply means being located on the inner circumference of the annular reverse osmosis membrane means;
   (g) means for creating a pressure differential across said reverse osmosis membrane to separate said original feed solution into said product solution and said exhaust solution; and
   (h) said supply means and said exhaust means being relatively axially spaced such that said feed solution travels along a combined radial and axial flow-path.

2. The apparatus of claim 1, including an evacuated enclosure means for said rotor assembly.

3. The apparatus of claim 2, said evacuated enclosure means is a shroud which fits closely around said rotor assembly for reducing windage at the peripheral edge of said rotor assembly.

4. The apparatus of claim 1, said means for creating a pressure differential is a drive means for imparting a rotational motion to said rotor assembly.

5. The apparatus of claim 1, said support means being hollow radial spokes.

6. The apparatus of claim 5, said supply means including means for admitting said original feed solution at said axle means and conducting it to said hollow radial spokes which conduct it radially to said annular pressure vessel.

7. The apparatus of claim 1, wherein said exhaust solution is removed from said axle at an end at which said supply means admits said feed solution.

8. The apparatus of claim 1, said product removal means including means for collecting said product solution.

9. The apparatus of claim 8, said product collecting means is in the form of an annular inwardly facing groove about the periphery of one end of said rotor assembly.

10. The apparatus of claim 1, said reverse osmosis membrane means being an annular spiral wound membrane cartridge extending spirally with respect to the axis of said axle.

11. The apparatus of claim 10, said spiral wound membrane cartridge comprising a cylindrical perforated shell defining an inner radius of said membrane cartridge and an envelope of two layers of membrane separated by a fine mesh spacer, said two layers of membrane being sealed along all but one edge radially closest to said perforated shell, said fine mesh spacer extending out from said unsealed edge of said envelope and being wrapped about said perforated shell such that said fine mesh spacer is open to said perforations, and a coarse mesh spacer is attached to the outer radius of said envelope and sealed to said envelope along an edge thereof closest to said perforated shell, whereby said coarse mesh spacer defining an axial flow path for said feed solution, and said product solution permeates through said membrane into said fine mesh spacer, and exits spirally inward towards said perforated shell, and said exhaust solution continues axially through said membrane means.

12. The apparatus of claim 11, said spiral wound membrane cartridge having a plurality of said membrane envelopes, each being separated by said coarse mesh spacer respectively, said plurality of envelopes and coarse mesh spacer providing an axial and radial flowpath for said feed solution, such that said the effects of concentration polarization and fouling is minimized.

13. The apparatus of claim 1, said annular reverse osmosis membrane means comprising a hollow fine fibre membrane cartridge having an annular geometry.

14. The apparatus of claim 13, said hollow fine fibre membrane cartridge providing an axial and radial flowpath for said feed solution, such that said the effects of concentration polarization and fouling is minimized.

* * * * *